(12) United States Patent
Sewall et al.

(10) Patent No.: US 10,925,435 B2
(45) Date of Patent: Feb. 23, 2021

(54) CERAMIC COOKER ROTISSERIE

(71) Applicant: Linwood Resources, LLC, Saint Paul, MN (US)

(72) Inventors: David O. Sewall, Saint Paul, MN (US); David R. Cleveland, Saint Paul, MN (US)

(73) Assignee: Linwood Resources, LLC, St. Paul, MN (US)

( * ) Notice: Subject to any disclaimer, the term of this patent is extended or adjusted under 35 U.S.C. 154(b) by 792 days.

(21) Appl. No.: 15/468,988

(22) Filed: Mar. 24, 2017

(65) Prior Publication Data

US 2017/0196398 A1    Jul. 13, 2017

Related U.S. Application Data

(63) Continuation of application No. 13/833,214, filed on Mar. 15, 2013, now Pat. No. 9,603,484.

(60) Provisional application No. 61/653,254, filed on May 30, 2012.

(51) Int. Cl.
*A47J 37/04* (2006.01)
*A47J 37/07* (2006.01)

(52) U.S. Cl.
CPC ............. *A47J 37/042* (2013.01); *A47J 37/04* (2013.01); *A47J 37/049* (2013.01); *A47J 37/0704* (2013.01)

(58) Field of Classification Search
CPC ......... A47J 37/00; A47J 37/04; A47J 37/0745
USPC ..... 99/421 R, 431 H, 421 HH, 421 HV, 419; 126/30, 14, 29
See application file for complete search history.

(56) References Cited

U.S. PATENT DOCUMENTS

| | | | |
|---|---|---|---|
| 3,276,440 A * | 10/1966 | Sazegar | A47J 37/0704 126/25 A |
| 3,809,058 A | 5/1974 | Becker | |
| 4,930,491 A | 6/1990 | Purello | |
| 5,315,983 A * | 5/1994 | Law | F24C 15/10 126/214 D |
| 5,515,774 A | 5/1996 | Swisher | |
| 5,558,008 A | 9/1996 | Jenkins | |
| 5,649,475 A * | 7/1997 | Murphy | A47J 37/049 126/25 R |
| 5,964,212 A | 10/1999 | Thompson | |
| 6,055,901 A | 5/2000 | Gantos | |
| 6,439,109 B1 | 8/2002 | Rehill | |
| 6,463,923 B2 | 10/2002 | Carley et al. | |

(Continued)

OTHER PUBLICATIONS

"BGE Rotisserie Chicken", video at youtube.com/watch?v=WP6TobZr0TE (2009).
"Rotisserie . . . On Big Green Egg. 1", video at youtube.com/watch?v=S_Ss4xApsDY (2011).
"Rotisserie . . . On Big Green Egg. 2", video at youtube.com/watch?v=7fiFFsF0aVQ (2011).

(Continued)

*Primary Examiner* — Tu B Hoang
*Assistant Examiner* — Thomas J Ward
(74) *Attorney, Agent, or Firm* — Patterson Thuente Pedersen, P.A.

(57) ABSTRACT

A rotisserie device useful in a partially opened, hinged, covered grill includes a support ring that is shaped and configured to inhibit airflow into and out of the grill when the cover is partially opened. The support ring includes one or more cover supporting portions or chocks that hold the cover and base apart when the cover is partially opened, and one or more apertures through the ring that can receive a rotatable spindle which serves as or which drives a removable, rotatable rotisserie spit.

27 Claims, 9 Drawing Sheets

(56) References Cited

U.S. PATENT DOCUMENTS

| | | |
|---|---|---|
| 7,644,711 B2 | 1/2010 | Creel |
| D615,807 S | 5/2010 | Creel |
| D615,814 S | 5/2010 | Creel |
| 7,770,576 B2 | 8/2010 | Polkinghorn |
| 9,668,615 B2 * | 6/2017 | Contarino, Jr. ......... A47J 37/07 |
| 2002/0017516 A1 | 2/2002 | McKeen et al. |
| 2008/0093808 A1 | 4/2008 | Quick |
| 2009/0308373 A1 | 12/2009 | Scott et al. |
| 2010/0095946 A1 | 4/2010 | Creel |
| 2010/0258105 A1 | 10/2010 | Simms, II |
| 2010/0258106 A1 | 10/2010 | Simms, II |
| 2011/0011274 A1 | 1/2011 | Thelen |
| 2011/0214662 A1 | 9/2011 | Contarino, Jr. |
| 2011/0283990 A1 | 11/2011 | Walters et al. |
| 2014/0021314 A1 | 1/2014 | Bourlier |

OTHER PUBLICATIONS

"Rotisserie . . . On Big Green Egg. 3", video at youtube.com/watch?v=5Ig9OjDgXuU (2011).
"Rotisserie chicken" downloaded from http://eggheadforum.com/discussion/535402/rotisserie-chicken (Nov. 2008).
"Egg-Tisserie" (2004).
CharBroil photo 1, 1 sheet (photo taken Mar. 14, 2014).
CharBroil photo 2, 1 sheet (photo taken Mar. 14, 2014).
CharBroil photo 3, 1 sheet (photo taken Mar. 14, 2014).
CharBroil photo 4, 1 sheet (photo taken Mar. 14, 2014).
"Weber Rotisserie Q300-Reihe (German and Google Translate versions) (May 2-Jul. 15, 2012)" downloaded from: http://forum.mybbq.net/viewtopic.php?f=26&t=33910&p=562535&hilit=Q300#p562535.
"Rotisserie Chicken on a Weber Q320—YouTube video (Apr. 13, 2013)" at http://www.youtube.com/watch?v=CAvskgyZ75c.

* cited by examiner

CERAMIC COOKER ROTISSERIE

CROSS REFERENCE TO RELATED APPLICATIONS

This application is a continuation of application Ser. No. 13/833,214 filed Mar. 15, 2013 (U.S. Pat. No. 9,603,484 B2), which claims priority from U.S. Provisional Application Ser. No. 61/653,254, filed May 30, 2012, the disclosures of which are incorporated herein by reference.

FIELD

This invention relates to rotisserie devices.

BACKGROUND

Many outdoor cooks prefer to grill juicy or fatty foods using a rotisserie. The slowly-turning spit employed in such devices promotes a self-basting action that may provide more even cooking, may retain liquids in the food that might otherwise drip away, may reduce flare-ups and may provide more moist cooked foods.

Covered gas grills frequently are sold with or may be equipped with a rotisserie device. The device generally includes an electric reduction gear drive motor and a removable spit having a pointed rod fitted with two or more opposing tined, movable forks that secure the food in place during cooking. The motor and spit typically are mounted on short pedestals or other supports arranged so that the food will be centered over the grill cooking surface. The upper half in a covered gas grill (viz., the cover or lid) generally includes slots that fit over the spit when the rotisserie is in use and the grill cover is closed (viz., during cooking).

Covered porcelain steel kettle-style charcoal grills usually are not sold with a rotisserie device but may be equipped with an aftermarket rotisserie adapter. The adapter typically includes a fixed height cylindrical ring that fits atop the kettle base. The grill cover sits atop the ring during cooking and is lifted away to obtain access to the food. The ring typically includes a motor support on which an included electric reduction gear drive motor may be mounted, and slots to support an included removable spit. Like the removable spit used in a gas grill, the spit normally includes two or more opposing tined, movable forks.

Covered ceramic (viz., kamado) charcoal-burning grills have been used for many centuries. A generally egg-shaped, kamado grill made in several sizes from modern-day ceramic materials is available from Big Green Egg, Inc. of Atlanta, Ga. and sold under the Big Green Egg trademark. Reportedly more than 1,000,000 Big Green grills have been sold worldwide since 1975. The manufacturer's literature and video supplied with a Big Green Egg state that a rotisserie is not needed. Despite this admonition, some owners of Big Green Egg grills have devised rotisserie support brackets that they mount on the lower half of an opened grill. A motorized rotisserie spit like those described above is laid across the supports and spans the cooking surface. The grill cover is left open during the cooking process. Other owners have disconnected the hinge and employed a fixed cylindrical ring like those discussed above for charcoal kettle grills to carry out rotisserie cooking without the cover, or with the disconnected cover placed atop the ring.

SUMMARY OF THE INVENTION

Although a wide range of accessories are marketed for Big Green Egg grills, rotisserie devices are not among them. The ceramic insulation used in such grills makes them very efficient cooking devices and may making the cooking process more even. However, the ceramic insulation also makes the grill quite heavy, e.g., with a weight of 140 lbs (63.5 Kg) for an 18¼ in (46.4 cm) diameter Large Big Green Egg. The cover normally is supported on a hinge mounted at the rear of the grill, and the cover opens and closes in clamshell style. This makes it impractical to use rotisserie adapter rings like those employed in the charcoal kettle grills discussed above. In larger ceramic grills, the hinge may also include a movable pivot and assist springs to aid in opening and closing the cover. For both large and small grills, considerable time and effort is required to affix and align the hinge to the grill base and cover. Normally this need only be done when the grill is first assembled.

The present invention provides, in one aspect, a rotisserie device, the device comprising a support ring for use in a partially opened hinged covered grill having a base and cover joined by the hinge, wherein the ring:

a) is shaped and configured to inhibit airflow into and out of the grill when the cover is partially opened,
b) includes a cover supporting portion that holds the cover and base apart when the cover is partially opened, and
c) has an aperture in the ring that can receive a rotatable spindle which serves as or which drives a removable, rotatable rotisserie spit.

In a preferred embodiment, the ring includes a tapered height cover supporting portion with a generally wedge-shaped side profile having a minimum height at a ring portion proximate the hinge and a maximum height at the ring portion distal to the hinge. In a further preferred embodiment, the ring includes a flat metal band and the tapered height cover supporting portion is a resilient heat-resistant gasket bonded to the band. In yet another preferred embodiment, the base and cover have sealing surfaces that contact one another when the grill cover is closed, the support ring comprises a generally cylindrical flanged ring disposed interiorly with respect to the tapered height cover supporting portion, the flanged ring has a ring height greater than that of the tapered height cover supporting portion at corresponding positions around the flanged ring, and the flanged ring strengthens the support ring and at least partially shields from grilling heat one or both of the base and cover sealing surfaces.

The present invention provides, in another aspect, a rotisserie device comprising the disclosed support ring and further comprising an electric reduction gear drive motor affixed to or rotatably fixed with respect to the support ring, a removable spit rotatably driven by the motor, and two or more tined forks that secure food on the spit during cooking.

The present invention provides, in another aspect, a hinged, covered grill having a base and cover joined by the hinge and further comprising the disclosed support ring supporting the cover in a partially opened position.

The disclosed devices enable rotisserie cooking on hinged, covered ceramic grills without requiring that the hinge or grill cover be detached from the grill base. During use, the device permits the cover to be closed sufficiently so as to discourage air leakage into or out of the grill, and provides improved cooking compared to the use of an uncovered grill. The device may be sold together with a new grill or as an aftermarket device for an existing ceramic grill. The disclosed devices may also be used in other hinged covered grills such as metal insulated charcoal-burning grills shaped to resemble covered ceramic grills.

BRIEF DESCRIPTION OF THE DRAWING

Like reference symbols in the various figures of the drawing indicate like elements. The elements in the drawing are not to scale.

DETAILED DESCRIPTION

Figure 1:
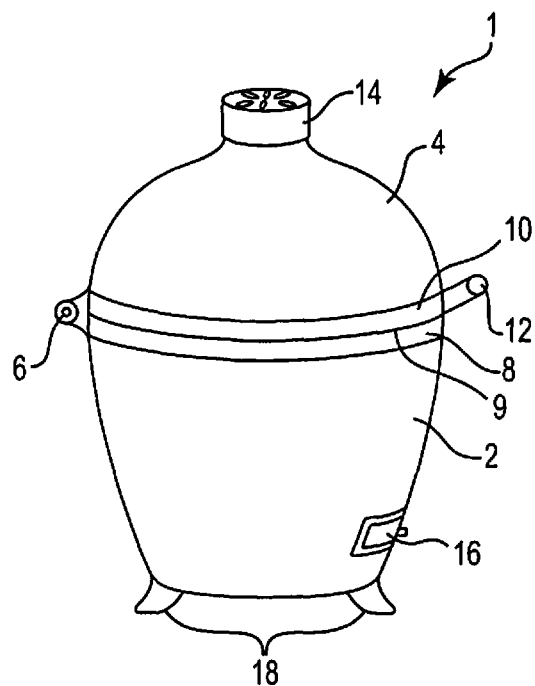
FIG. 1 is a side view of a hinged, covered ceramic grill in a closed position.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a rotisserie spit that includes "a" tined fork means that the spit includes "one or more" tined forks.

The term "aperture" means a hole, slot or other opening.

The term "essentially the same" when used with respect to a numerical measure or quantity means within ±10% and more preferably within ±5% of that measure or quantity.

The term "grill" means a cooking device capable of a variety of cooking tasks including but not limited to grilling, baking, smoking and roasting.

The terms "half" and "halves" when used in reference to a covered grill are approximate, and need not represent a geometric one-half of the total shell surface in a covered grill. An individual half normally will be a lower surrounding shell that holds charcoal or other heat source, or an upper surrounding shell that serves as a cover.

Unless otherwise specified, the term "height" when used in respect to an element of the disclosed support ring refers to the length of a vertical line segment bisecting that element. In some specified contexts the terms "above", "below" or "height" refer to the orientation of an element with respect to another element.

The term "inhibit airflow" when used in reference to the disclosed rotisserie device support ring means the ring will limit substantially or will prevent airflow into and out of a partially opened grill in which the support ring has been installed. The desired degree of airflow inhibition may vary, and desirably will be such as to permit extinguishment of burning coals in an otherwise closed grill due to combustion air starvation, Lesser degrees of airflow inhibition may be tolerated in some circumstances, for example airflow inhibition sufficient to discourage or prevent runaway temperature increases, or airflow inhibition sufficient to permit the temperature in a burning grill to be maintained at or below 149° C. (300° F.), 121° C. (250° F.) or 107° C. (225° F.) using the adjustable top and bottom dampers normally included with a hinged, covered charcoal-burning grill.

The term "joinder seam" when used in reference to a hinged, covered grill refers to the parting plane or parting line defined by the mating sealing surfaces of the grill base and cover when the cover is fully closed and its cover sealing surface is in full normal contact with the base sealing surface.

The terms "partially opened" and "partially uncovered" when used in reference to a hinged, covered grill, mean that the grill cover has been rotated away from the grill base through a portion of but not through all of its hinged travel arc, so that the cover and base no longer contact one another through the full extent of their normal sealing surfaces. In such a position the cover and base sealing surfaces may however contact the installed rotisserie device. The terms "partially opened" and "partially uncovered" thus may refer to a hinged, covered grill either before or after installation of the disclosed rotisserie device support ring between the grill cover and grill base. These terms will be used whether or not other grill openings (such as the air intake vent normally provided in a grill base, or the combustion product exhaust vent normally provided in a grill cover) are fully or partially open or closed.

The term "ring" when used in reference to the disclosed rotisserie device support ring means a heat-resistant object having a generally open interior portion surrounded by a chock, wall or other grill-contacting portion that when viewed in cross-section from above its normal orientation during use has a continuous or nearly continuous rounded or at least partially rounded cross-sectional shape. Suitable ring shapes include circular shapes like those in the mating halves of a Big Green Egg grill, oval shapes like those in the mating halves of a Primo grill (from Primo Grills and Smokers of Tucker, Ga.), flattened teardrop shapes like those in the mating halves of a Komodo Kamado OTB grill from Komodo Kamado of Bali, Indonesia (which, it may be noted, includes as supplied a small hole in the base which receives the motorized drive spindle of an accessory rotisserie device), and other functionally similar shapes.

Turning now to FIG. 1, hinged, covered ceramic grill 1 is generally egg-shaped and includes lower approximate half or base 2, upper approximate half or cover 4, and fixed pivot hinge 6. Hinge 6 is affixed to clamping bands 8 and 10 which respectively surround base 2 and cover 4. Base 2 and cover 4 have sealing surfaces that contact one another at joinder seam 9 when covet 4 is fully closed. Handle 12 attached to band 10 permits cover 4 to be raised by rotating cover 4 away from base 2 in an are around hinge 6. As shown, grill 1 also includes an adjustable top damper 14 and adjustable bottom damper 16, and rests on supporting feet 18. As will be understood by those skilled in the ceramic grill art, grill 1 may be supported in a variety of other devices including wheeled or stationary nests, tripods and supporting tables (not shown in FIG. 1).

Figure 2:
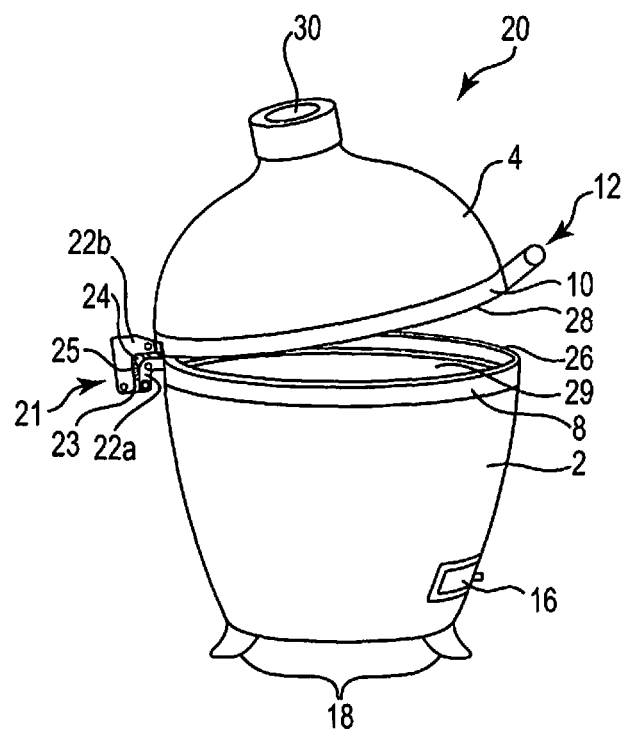
FIG. 2 is a side view of another hinged, covered ceramic grill in a partially opened position.

FIG. 2 illustrates a ceramic grill 20 in which base 2, cover 4, bands 8 and 10, damper 16 and feet 18 are as in FIG. 1, but in which fixed pivot hinge 6 has been replaced by a movable pivot hinge 21. Hinge 21 includes lower arm 22a, upper arm 22b, lever arms 23 and 24 and one or more springs 25. In a typical such hinge, there may be two each of lower arm 22a, upper arm 22b, lever arms 23 and 24, and two or four springs 25, arranged side-by-side and separated by a span of about 4 to 10 inches (10 to 25 cm). When cover 4 is opened, arms 23 and 24 rotate so as to cause both the effective pivot point of hinge 21 and the portion of cover 4 nearest hinge 21 to move laterally away from and downwardly with respect to base 2 as cover 4 moves upward. This lateral and downward movement and the action of spring(s)

24 helps raise and balance cover 4 as it approaches a fully opened position. The same lateral and downward movement introduces additional complexities in the design of the disclosed support ring, as discussed in more detail below in connection with FIG. 14 through FIG. 19.

In FIG. 2, grill 20 is shown in a partially opened position. Mating sealing surfaces 26 and 28 include a felt, fiber or flexible rope gasket typically made of a heat resistant material. Ceramic fire ring 29 is visible inside grill 20, but other commonly-employed accessories such as a wire cooking grid, ceramic plate setter, cast iron griddle, pizza stone, tiered rack and the like have been omitted for clarity. Adjustable top damper 14 as shown in FIG. 1 has also been removed, leaving exhaust outlet 30 visible.

Figure 3A:
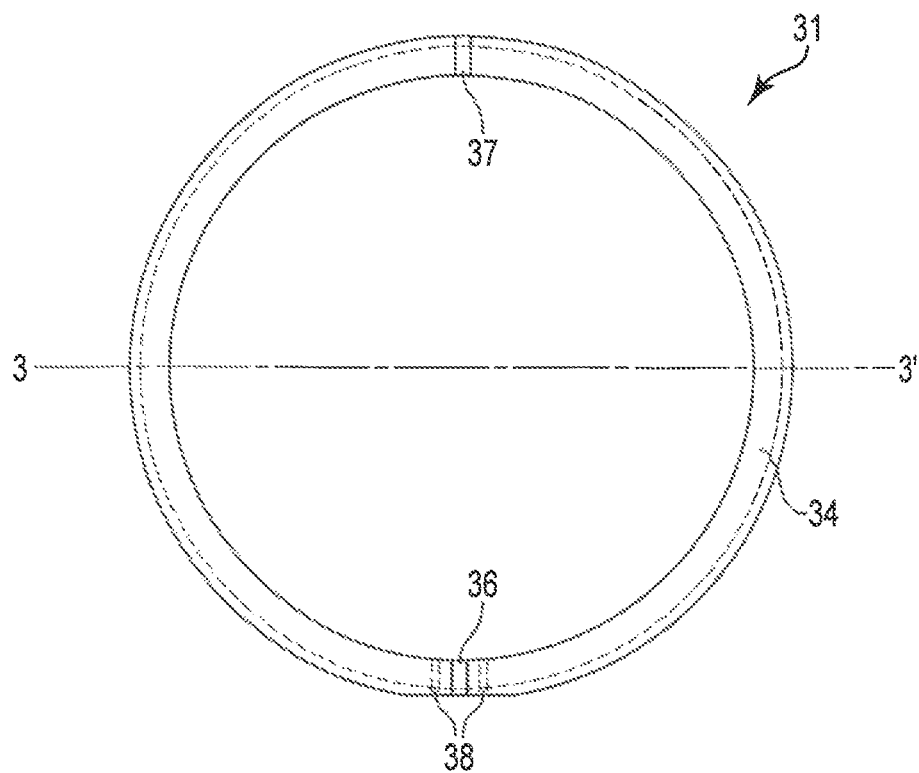
FIG. 3A is a plan view of a rotisserie device support ring for use in a hinged, covered grill.
Figure 3B:
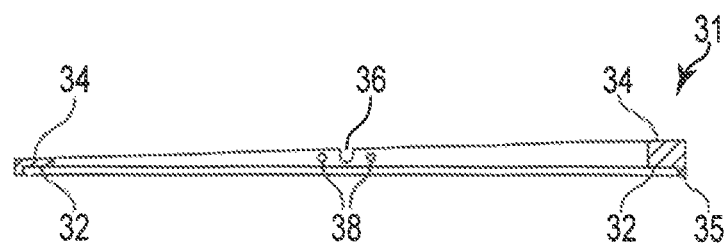
FIG. 3B is a side sectional view of the FIG. 3A ring taken through lines 3-3'.

FIG. 3A is a plan view of a rotisserie support ring 31 for use in a hinged, covered grill like that shown in FIG. 1 or FIG. 2. FIG. 3B is a side sectional view of the FIG. 3A ring taken through lines 3-3' in FIG. 3A. Ring 31 includes a lower mating surface 32 designed to engage with the complementary mating sealing surface of base 2, and an upper mating surface 34 designed to engage with the complementary mating sealing surface of cover 4. Viewed in side sectional view as in FIG. 3B, ring 31 has a generally wedge-shaped side profile with a minimum height at the ring portion nearest the grill hinge and a maximum height at the ring portion furthest from or distal to the grill hinge. Ring 31 is appropriately shaped and appropriately dimensioned or configured to inhibit airflow into and out of a partially opened grill in which ring 31 has been installed, and also serves as a supporting portion or chock that holds the cover and base apart in a desired partially opened position.

For ease of reference in portions of the remaining description, clock numerals will sometimes be used to describe regions around the perimeter of the disclosed support rings when viewed from above as in FIG. 3A. Clock position 12 will refer to the ring position nearest the hinge in a hinged, covered grill. Clock position will refer to the ring position opposite from or distal to the hinge, and normally will correspond to the handle position in a hinged, covered grill. In grills equipped with clamping bands surrounding the base, cover or both base and cover, clamping screws are often located at approximately the 10 o'clock to 2 o'clock positions. The chock portion of ring 31 is shortest (viz., has least height or vertical thickness) at the 12 o'clock position and is tallest (viz., has its greatest height or vertical thickness) at the 6 o'clock position.

As shown in phantom in FIG. 3A and in cross-section in FIG. 3B, ring 31 includes downwardly-projecting lip 35 on the outer periphery of ring 31 to help center and retain ring 31 atop base 2. If desired, lip 35 could be located on the inner periphery of ring 31, and may project upward rather than or in addition to downward so as to engage or also engage cover 4. In any event, appropriate horizontal clearance (e.g., 1 mm, 5 mm or more) desirably is provided between lip 35 and the respective inner or outer peripheral diameter of base 2 or cover 4 to allow for any differences in the thermal expansion rates of ring 31 relative to base 2 or cover 4 when the grill and support ring 31 are heated during grilling. Lip 35 may be continuous as shown in FIG. 3A and FIG. 3B, or discontinuous. For example, lip 35 may be in the form of several (e.g., three or more) small projections, or may be in the form of an arc having one or more cutouts such as a cutout near the grill hinge. Lip 35 may if desired be replaced by or augmented with a plurality of projecting tangs fastened to the outside or inside of ring 31 to help locate ring 31 atop base 2 or under cover 4.

Ring 31 also includes apertures (in this case slots) 36, 37 dimensioned or configured to receive a motorized gear reduction motor (not shown in FIG. 3A or 3B) and mounting holes 38 for supporting the gear reduction motor or its mounting bracket (also not shown in FIG. 3A or FIG. 3B). As shown in FIG. 3A and FIG. 3B, slot 36 is at the 9 o'clock position and slot 37 is at the 3 o'clock position. Slots 36, 37 could be located at other ring positions if desired. For example, somewhat better ergonomics for left-handed users will result if slot 36 and the associated gear reduction motor are located at the 1 to 2 o'clock positions of ring 31 and if slot 37 is located at the 7 to 8 o'clock positions. Such a placement may enable a left-handed user to grasp the handle of a rotisserie spit more readily than if the slots are at the 3 o'clock and 9 o'clock positions. Similarly, somewhat better ergonomics for right-handed users will result if slot 36 and the associated gear reduction motor are located at the 10 to 11 o'clock positions of ring 31 and slot 37 and the associated rotisserie spit handle are located at the 4 to 5 o'clock positions. If desired, multiple slot pairs may be included, optionally together with plugs or suitable inserts for blocking off slots that are not in use. One or both of slots 36, 37 may also be replaced by a hole or other strengthened aperture, thereby improving the strength or durability of ring 31 but potentially making it somewhat more difficult to insert or remove a rotisserie spit or a spindle for driving such a spit. If desired, only a single aperture need be employed, for use with rotisserie spits whose free end (viz., the end not coupled to a drive motor) will lie inside the grill during use. Ring 31 may if desired be equipped with one or more handles (not shown in FIG. 3A and FIG. 3B) to assist in lifting ring 31 onto or off of base 2. Ring 31 may also include logos, warning legends, outer or inner coloration (e.g., to match the green color of a Big Green Egg grill or the black color of its metal bands) or dimpling or other surface modification (e.g., to match the dimpled outer ceramic surface of a Big Green Egg grill).

Ring 31 may be made from a variety of heat-resistant materials including metals such as aluminum, steel or east iron; heat-resistant ceramics; molded heat-resistant fibrous insulation materials; molded heat-resistant flexible materials such as silicone rubbers; Portland cement; concrete; and combinations of the foregoing. Exemplary steels include cold-rolled steel and stainless steel. Exemplary silicone rubbers include addition-cure, peroxide-cure and room-temperature vulcanizing (RTV) silicones. Exemplary ceramics include alumina, boron nitride, cordierite, mullite, silicon carbide, spinel, steatite, titanium carbide, Wollastonite, zirconia (including partially stabilized zirconia), glass-ceramics, porcelain, earthenware, reinforced ceramic composites and mixtures or combinations thereof. Foamed and other insulating ceramics may also be employed. The ceramic from which the Big Green Egg plate setter is made appears to be an especially suitable ceramic material. Exemplary ceramic material suppliers or ceramic part manufacturers include Accuratus Corp., Applied Ceramics, Inc., Associated Ceramics and Technology, Inc., Bailey Ceramic Supply, BASF, Continental Clay, CoorsTek, Inc., McDaniel Advanced Ceramic Technologies, National Ceramic Co., Saint-Gobain Advanced Ceramics, Wunder Mold and other suppliers or manufacturers that will be familiar to persons having ordinary skill in the ceramic cooker art.

If made partly or entirely from metal, ring 31 may be formed in a variety of ways including milling; cutting appropriately-tapered rings from cylindrical stock; casting; sintering; cutting or otherwise machining flat stock; or by rolling strips or other flat stock to form a ring perform and then welding, riveting or otherwise joining the preform ends to form a continuous ring. If made from a relatively brittle material such as a ceramic, then ring 31 desirably will be formed using molding, sintering or casting and firing operations, and with adjustment of the ring dimensions as needed so as to avoid undue fragility at the 12 o'clock ring position or at the ring positions near slots 36, 37. In such instance a greater partial cover opening may be desirable during use so as to provide sufficient thickness proximate the grill hinge. The ring may also or instead be strengthened using an inner or outer flanged ring, for example an inner flanged ring as shown in FIG. 14 through FIG. 17.

Figure 4:
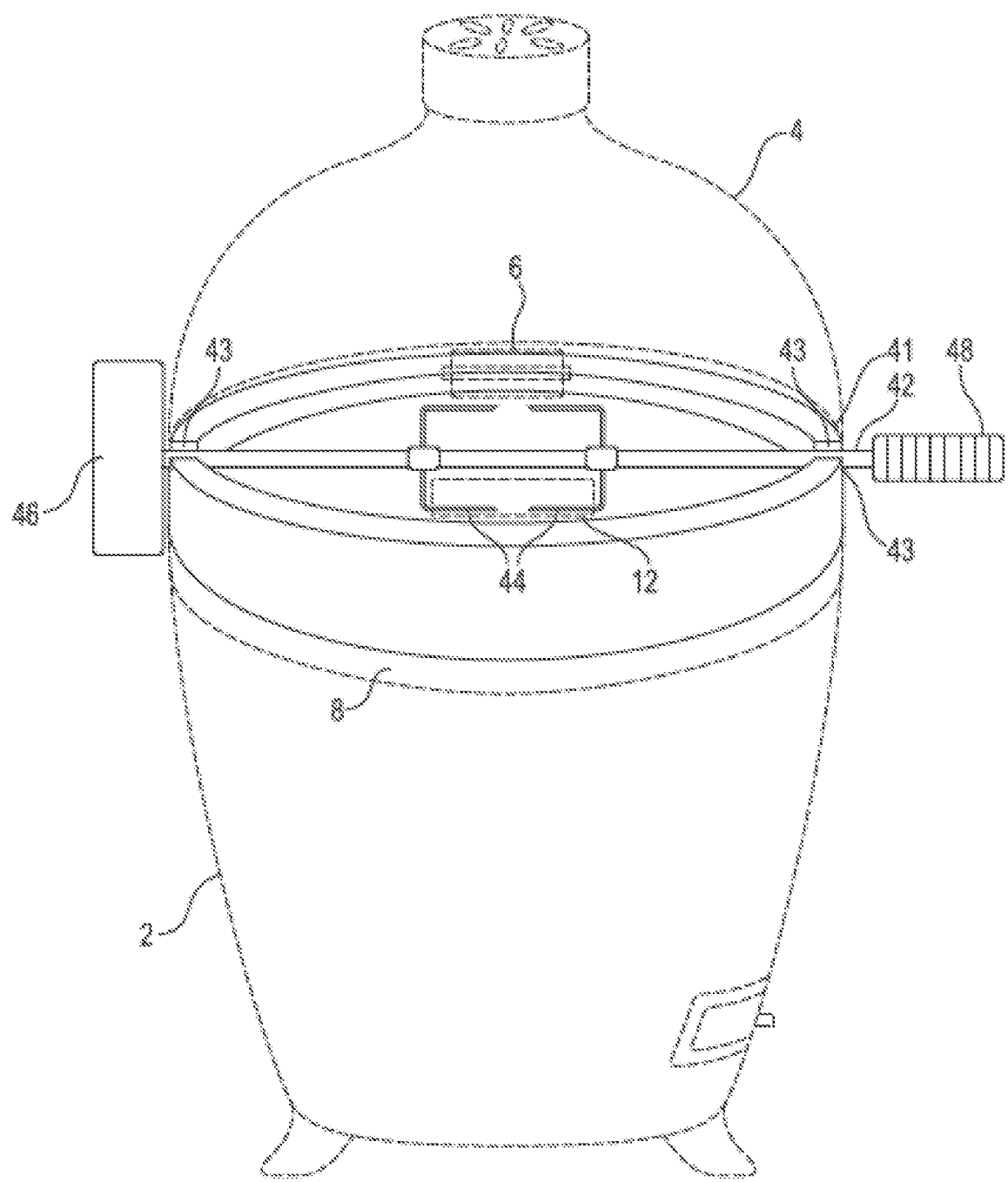
FIG. 4 is a perspective view, partially in phantom, of an embodiment of the disclosed rotisserie device in use on a grill like that in FIG. 1.

FIG. 4 is a perspective view showing an embodiment 41 of the disclosed rotisserie ring installed between base 2 (shown in phantom) and partially opened cover 4 (shown in phantom). Ring 41 has a minimum height at the 12 o'clock position nearest hinge 6 (shown in phantom) and a maximum height at the 6 o'clock position distal to hinge 6 and proximate to handle 12 (shown in phantom). Rotisserie spit 42 rides in slots 43 and carries food-engaging tined forks 44. Spit 42 is rotatably driven by electric motor 46. Handle 48 assists in installation and removal of spit 42 in and from ring 41. Motor 46 may be affixed to or rotatably fixed with respect to ring 41 using a variety of mounting devices (not shown in FIG. 4), including employing projecting tabs that slip between one or both of the lower or upper mating ring surfaces and the corresponding base or cover mating sealing surfaces, a mounting base secured to band 8 using fasteners or a magnetic clamp, or a mounting bracket permanently or removably affixed to ring 41. Motor 46 may be permanently or removably fixed to such a mounting device. Rotisserie gear reduction drive motors like those shown in FIG. 4 typically have a generally vertical orientation with a center of mass which in use lies below the central axis of spit 42. For mounting devices affixed to ring 41 or band 8, it may be desirable to rotate motor 42 so that its housing has a generally horizontal orientation. This will permit the housing to be rotationally affixed to ring 41 or band 8 at a greater lever arm distance from spit 42, thereby providing the motor mount with improved resistance to torque or shock loads caused by large or poorly-balanced rotating foods (e.g., turkeys). Base 2 may also be mounted in a table or nest configuration having a table top or other potentially interfering structure close to the joinder seam. In such cases motor 42 may need to be rotated or otherwise realigned or redesigned so that adequate clearance is maintained between the drive motor and table top or other structure. For example, the drive motor center of mass may need to be raised so that it lies at or above the central axis of spit 42. If the motor housing is rotated, normally downwardly-facing vents in the drive motor may need to be redesigned or relocated so that rain will not enter the drive motor in its new orientation.

The dimensions and overall shape of the disclosed support ring may be adapted as need be to accommodate various grill models and sizes. For example, Big Green Egg models are available with nominal wire cooking grid diameters of 24 cm (9.5 inches) for the Mini grill, 33 cm (13 inches) for the Small grill, 38 cm (15 inches) for the Medium grill, 46 cm (18.25 inches) for the Large grill and 61 cm (24 inches) for the Extra Large grill, and with a grill wall thickness at the mating sealing surfaces of about 25 cm (1 inch) in the case of a Large grill and with similar, lesser or greater grill wall thicknesses for other size grills. The support ring inside diameter, outside diameter and horizontal thickness (e.g., mating surface width, or overall thickness including the mating surface and other supporting structure) accordingly may vary. For rings used on a Big Green Egg grill, the ring inside diameter may for example be about 20 cm (8 inches) to about 60 cm (24 inches), the ring outside diameter may for example be about 28 cm (11 inches) to about 69 cm (27 inches) and the ring thickness may for example be about 10 mm (0.4 inches) to about 5 cm (2 inches). For use on a Large Big Green Egg, ring 31 as shown in FIG. 3 may for example have a height between mating surfaces 32 and 34 of about 5 to about 20 mm (0.2 to 0.8 inches) at the 12 o'clock ring position and about 20 to about 127 mm (0.8 to 5 inches) at the 6 o'clock ring position. The extent to which the grill cover is partially opened in use may for example range from about 3 to about 25, about 4 to about 15 or about 4 to about 10 degrees of upward cover rotation with respect to the joinder seam. The same angle ranges may be used to describe the taper between the upper (grill cover) and lower (grill base) mating surfaces in the disclosed support ring. The above dimensions and angles may be varied as needed for other ring materials, other grill models, other grill sizes, and to accommodate lesser or greater extents of partial cover opening during support ring installation and use. The support ring inside diameter may also be sized to permit or not permit wire cooking grid installation into and removal from the grill while the disclosed support ring is installed. Exemplary other mills that can be used with the disclosed rotisserie device include those shown in U.S. Pat. No. 3,276,440 (Sazegar) and U.S. Pat. No. 3,809,058 (Becker), in U.S. Published Patent Application Nos. U.S. 2009/0308373 A1 (Scott et al.), U.S. 2010/0095946A1 (Creel), U.S. 2010/0258105 A1 (Simms, II) and U.S. 2010/0258106 A1 (Simms, II), and hinged covered grills from suppliers including Bayou Classic, Big Steel Keg, California Kamado, Char-Broil, Char-Griller, GourmetPot, Grill Dome, Imperial Kamado, Kamado Joe, Komodo Kamado, Meteor, Monolith Grill GmbH, Primo Grills and Smokers, and Saffire. The disclosed rotisserie device may also be used in place of devices such as the device shown in U.S. Pat. No. 5,964,212 (Thompson).

The gaskets 26 and 28 shown in FIG. 2 are generally quite heat-resistant, but may melt or otherwise deform if exposed to excessive temperatures. Excessive gasket temperatures may for example arise during overly-vigorous initial startup, when baking pizzas, during flare-ups, or when "burping" the grill (viz., cracking open the cover under air-starved cooking conditions to cause a controlled flare-up). Most rotisserie cooking takes place at relatively low grill temperatures, for example about 93 to 204° C. (200 to 400° F.), and most ceramic grill cooking takes place at temperatures below the 400° C. (750° F.) maximum temperature measured by the thermometer included with a Big Green Egg grill. The gaskets used in a Big Green Egg reportedly will withstand temperatures as high as 593° C. (1100° F.). Although the rotisserie ring design shown in FIGS. 3A and 3B can readily be used at relatively low to normal cooking temperatures, excessive temperatures might under some circumstances cause gaskets 26 or 28 to melt or become adhered to ring 31. This may be more likely to occur when ring 31 is made from a highly thermally-conductive metal such as aluminum. Consequently, other support ring designs may be employed to reduce the likelihood that gasket melting might occur. FIGS. 5 through 20 illustrate a number of embodiments that may be used to provide a more heat-resistant support ring structure. The embodiments in FIGS. 5 through 13 are each shown as a sectional view taken at the 8 o'clock ring position, the embodiment in FIG. 14 through FIG. 19 is shown in a variety of views, and the embodiment in FIG. 20 is shown as a side view.

Figure 5:
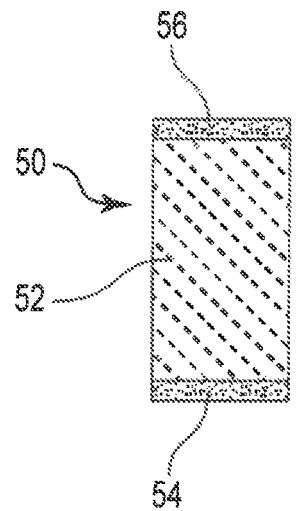
FIG. 5 through FIG. 13 are cross-sectional views of additional embodiments of the disclosed rotisserie device support ring.

FIG. 5 shows a support ring 50 having a central portion 52 made for example of metal or ceramic and including auxiliary lower and upper high temperature-resistant gaskets 54, 56. Gaskets 54, 56 help reduce heat transfer from portion 52 to the mating sealing (and typically gasketed) surfaces of base 2 or cover 4. A variety of high temperature-resistant gasketing materials may be employed, including NOMEX™ or KEVLAR™ aramid fibers, both from E.I. duPont de Nemours and Company; ULTRA TEMP™ alumina tape or cloth from Cotronics Corporation; molded, paper or textile high temperature products from Ibiden Co., Ltd.; GRAPHO-GLAS™ gasketing from Rutland Fire Clay Company; silicone rubber gaskets from a variety of suppliers; and other heat-resistant materials that will be familiar to persons having ordinary skill in the ceramic cooker art.

Figure 6:
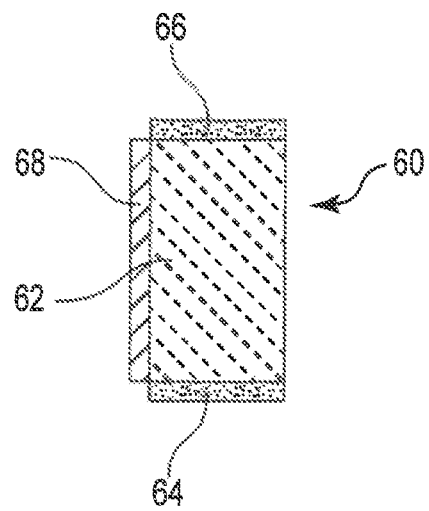

FIG. 6 shows a support ring 60 having a central portion 62 made for example of ceramic, having high temperature-resistant sealing gaskets 64, 66 and surrounded by an outer metal band 68. Band 68 helps reinforce central portion 62, and if dimensioned or configured so that it rests between rather than outside base 2 and cover 4 during cooking (or if dimensioned or configured so that it contacts bands 8 and 10 during cooking) may reduce compression forces on central portion 62. Gaskets 64, 66 may help reduce heat transfer to the mating sealing surfaces of base 2 or cover 4.

Figure 7:
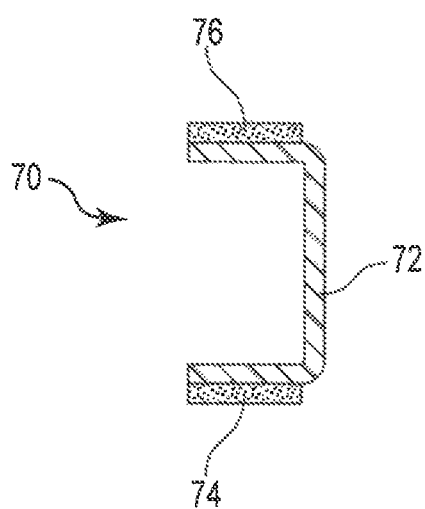

FIG. 7 shows a support ring 70 having an outwardly-facing generally C-shaped central portion 72 made for example of metal, and including high temperature-resistant lower and upper sealing gaskets 74, 76. The reduced mass and increased outer air exposure of central portion 72 may help reduce heat transfer to the mating sealing surfaces of base 2 or cover 4.

Figure 8:
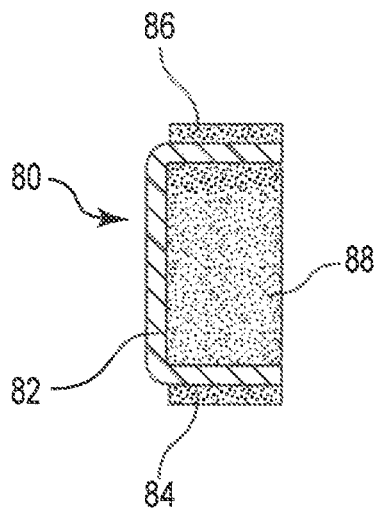

FIG. 8 shows a support ring 80 having an inwardly-facing central portion 82 made for example of metal, including high temperature-resistant lower and upper sealing gaskets 84, 86 and having an inner high temperature-resistant filler portion 88. Filler portion 88 (which may for example be made of a gasketing material or of ceramic) may help reduce heat transfer to central portion 82 and to the mating sealing surfaces of base 2 or cover 4.

Figure 9:
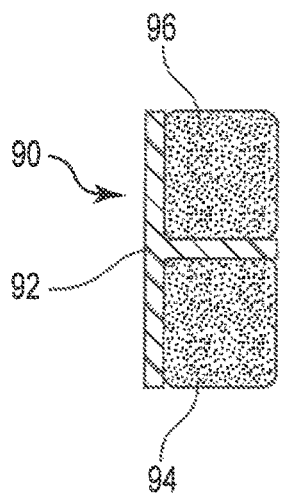

FIG. 9 shows a support ring 90 having a tee-shaped inwardly-facing central portion 92 made for example of metal or ceramic and including high temperature-resistant lower and upper sealing gaskets 94, 96. Gaskets 94, 96 may help reduce heat transfer into central portion 92 and to the mating sealing surfaces of base 2 or cover 4.

Figure 10:
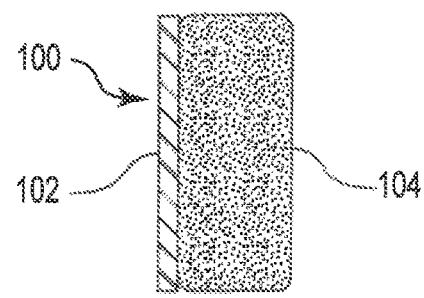

FIG. 10 shows a support ring 100 having an outer surrounding ring 102 made for example of metal and an inner high temperature-resistant ring portion 104. Ring portion 104 may help reduce heat transfer into ring 102 and to the mating sealing surfaces of base 2 or cover 4.

Figure 11:
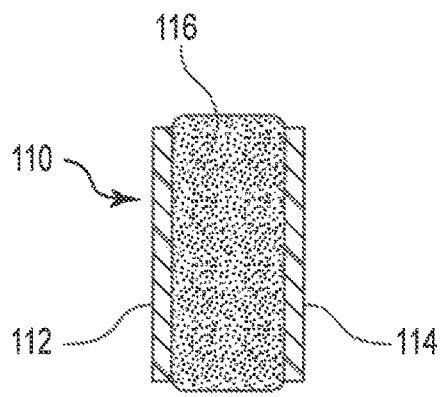

FIG. 11 shows a support ring 110 having an outer surrounding ring 112 made for example of metal, an inner shielding ring 114 made for example of metal, and a sandwiched central portion 116 made for example from high temperature-resistant gasketing material. Shielding ring 114 helps protect central portion 116 from grilling heat, and both portions 114 and 116 may help reduce heat transfer to the mating sealing surfaces of base 2 or cover 4.

Figure 12:
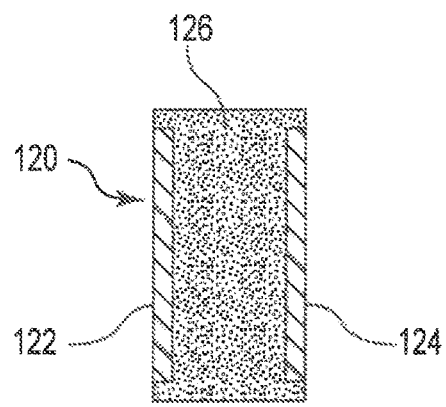

FIG. 12 shows a support ring 120 having an outer surrounding ring 122 made for example of metal, an inner shielding ring 124 made for example of metal, and a molded central portion 126 made for example from high temperature-resistant gasketing material. Shielding ring 124 helps protect central portion 126 and both portions 124 and 126 may help reduce heat transfer to the mating sealing surfaces of base 2 or cover 4.

Figure 13:
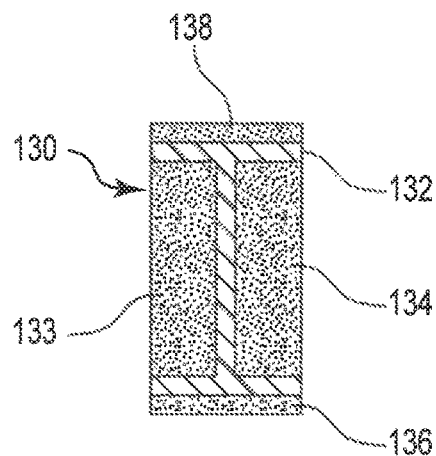

FIG. 13 shows a support ring 130 having an I-beam-shaped machined, molded or cast central portion 132 made for example of metal, an outer insulating ring 133 and inner insulating ring 134 both made for example from high temperature-resistant gasketing material, and high temperature-resistant lower and upper sealing gaskets 136, 138. Inner insulating ring 134 and gaskets 136, 138 may help reduce heat transfer to the mating sealing surfaces of base 2 or cover 4.

Figure 14:
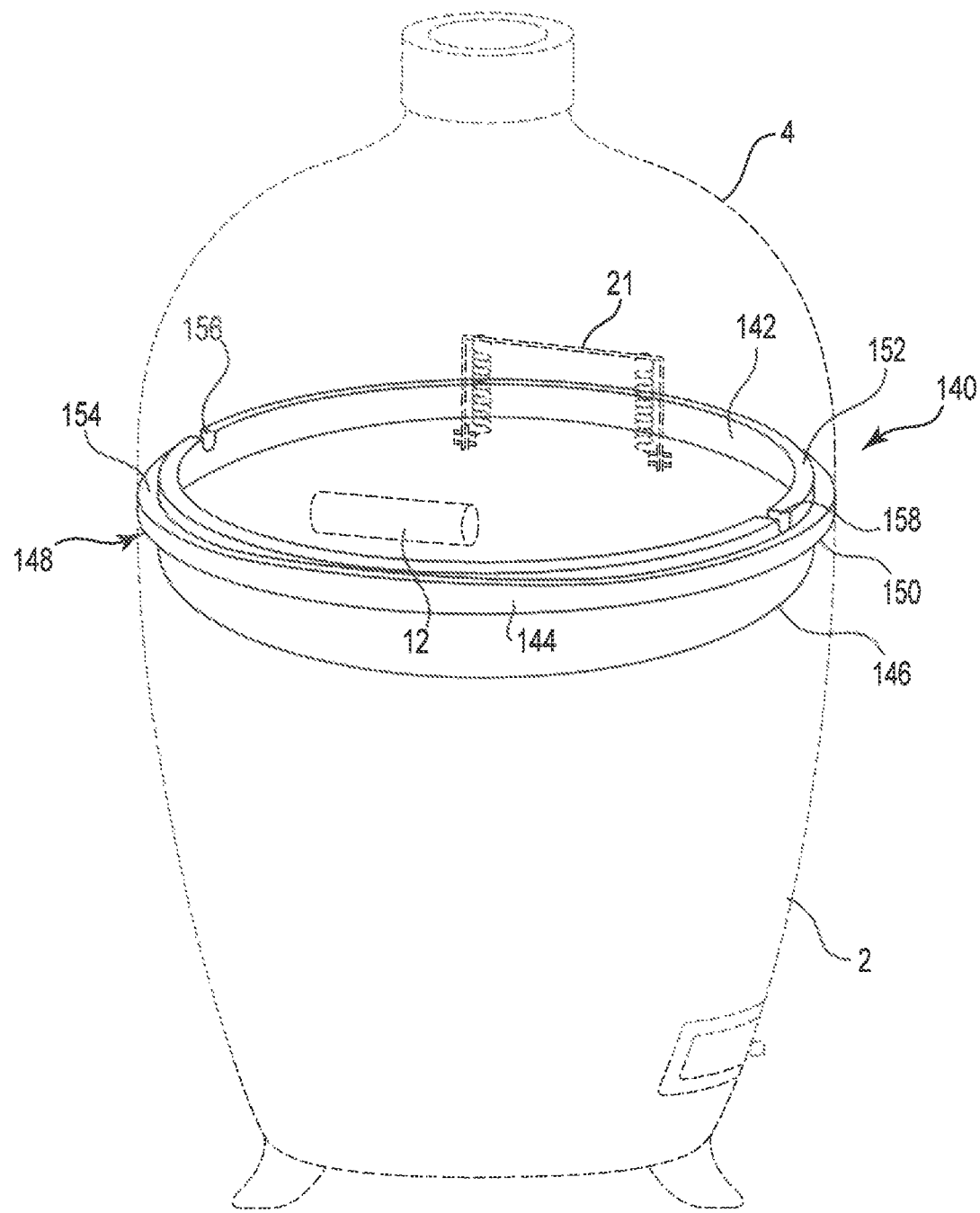
FIG. 14 is a perspective view, partially in phantom, of a flanged rotisserie device support ring in use on a grill like that in FIG. 2.

FIG. 14 is a perspective view of a flanged rotisserie device support ring 140 especially suited for use with moving pivot hinged, covered grills like that shown in FIG. 2. Ring 140 may if desired also be used with fixed pivot hinged, covered grills like that shown in FIG. 1. Ring 140 may be made for example from ceramic, and includes a generally cylindrical flanged ring 142 disposed interiorly with respect to tapered height, generally wedge-shaped cover supporting portion or chock 144. Chock 144 has its greatest height at the 12 o'clock ring position near handle 12 (shown in phantom). Chock 144 preferably wraps only partially around flanged ring 142, and terminates before reaching hinge 21 (shown in phantom). Flanged ring 142 also includes rotisserie spit slots 156, 158. As shown in FIG. 14, flanged ring 142 has a constant height and includes base flange 146 which extends below joinder seam 148 and base mating surface 150. Flanged ring 142 also includes cover flange 152 which extends above cover mating surface 154 for most or all of its extent around chock 144.

Figure 15:
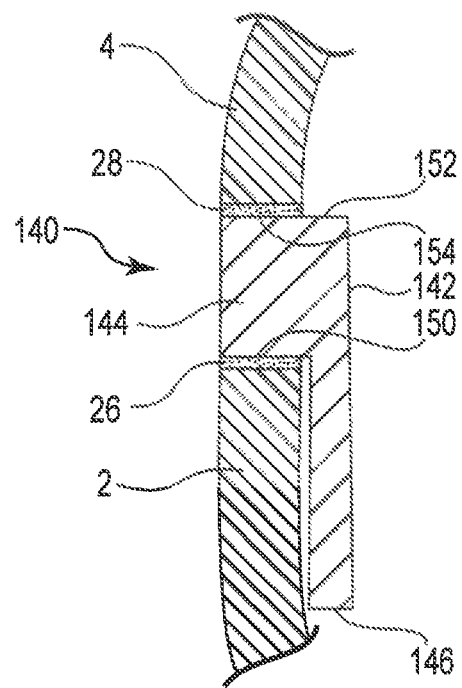
FIG. 15 through FIG. 19 are cross-sectional views through the FIG. 14 support ring.

FIG. 15 is a cross-sectional view showing support ring 140 installed between grill base 2 and partially opened grill cover 4 at the 6 o'clock ring position. Chock 144 holds base 2 and cover 4 apart. Base mating surface 150 is in sealing engagement with base gasket 26, and cover mating surface 154 is in sealing engagement with cover gasket 28. As shown in FIG. 14 and FIG. 15, at the 6 o'clock position of ring 140 cover flange 152 is at the same height with respect to the joinder seam as cover mating surface 154. Cover flange 152 may however have a greater height, lesser height or varying height with respect to the joinder seam, and may for example if desired project above or may lie slightly below cover mating surface 154 at the 6 o'clock ring position. Flanged ring 142 has a ring height (viz., the vertical distance from the bottom of base flange 146 to the top of cover flange 152) greater than that of chock 144 at corresponding positions around flanged ring 142. Flanged ring 142 desirably is several times (e.g., 4 to 20 times) as tall as it is thick, as increased height contributes greatly to the overall beam strength of flanged ring 142 and support ring 140.

Figure 16:
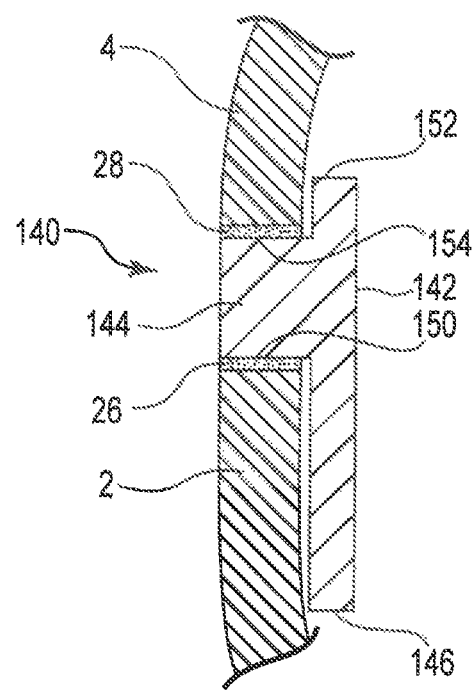

FIG. 16 is a cross-sectional view through support ring 140 at the 8 o'clock ring position. Chock 144 has a lesser vertical thickness than at the ring position shown in FIG. 15, and cover flange 152 projects above cover mating surface 154. Base mating surface 150 is in sealing engagement with base gasket 26, and covet mating surface 154 is in sealing engagement with cover gasket 28.

Figure 17:
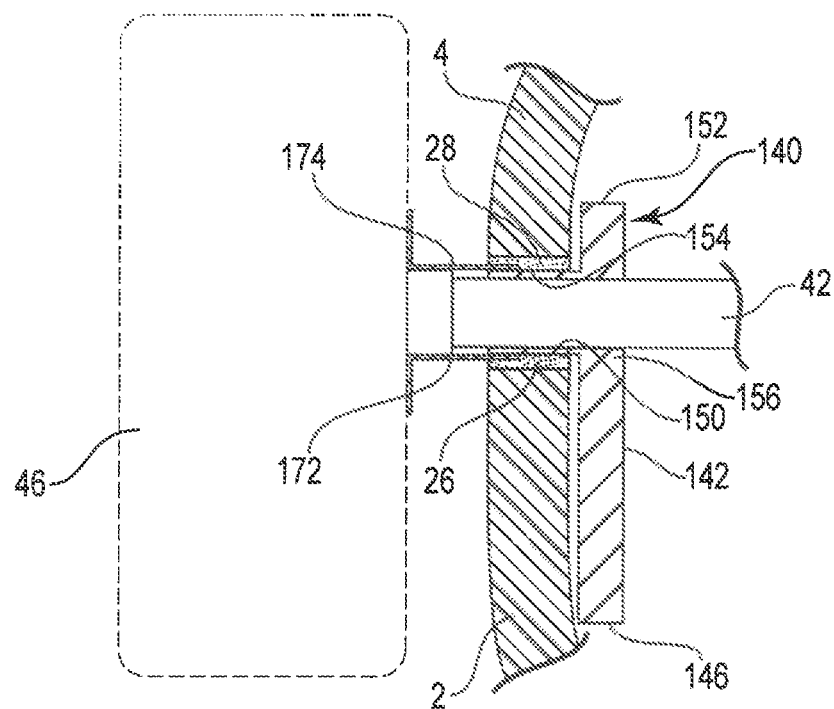

FIG. 17 is a cross-sectional view through support ring 140 at the 9 o'clock ring position, and bisects rotisserie spit slot 156, rotisserie spit 42 and motor 46. The interior components of motor 46 have been omitted for clarity. Chock 144 (not designated in FIG. 17) is at least partially and preferably completely interrupted by rotisserie spit slot 156. Mounting tab 172 attached to motor 46 extends at least part way into the sealing region between base mating surface 150 and base gasket 26. Mounting tab 174 attached to motor 46 extends at least part way into the sealing region between cover mating surface 154 and cover gasket 28. Mounting tabs 172, 174 rotatably fix motor 46 with respect to support ring 140.

Figure 18:
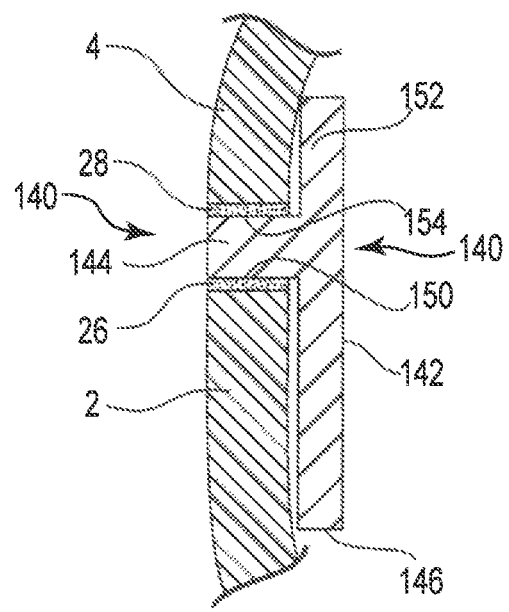

FIG. 18 is a cross-sectional view through ring 140 at the 10 o'clock ring position. Chock 144 is relatively thin at this ring position, and preferably terminates at or near this ring position. Chock 144 thus preferably extends around the majority of but not all of ring 140, and preferably terminates proximate the grill hinge at points at which the height of chock 144 has tapered to a sufficiently small value so as to pose a risk of breakage. For example, for a ring made from ceramic and having a profile like that shown in FIG. 14, chock 144 may terminate at approximately the 1 to 2 o'clock and 10 to 11 o'clock ring positions, when chock 144 has diminished to a height less than about ⅛ inch or 3 mm.

Figure 19:
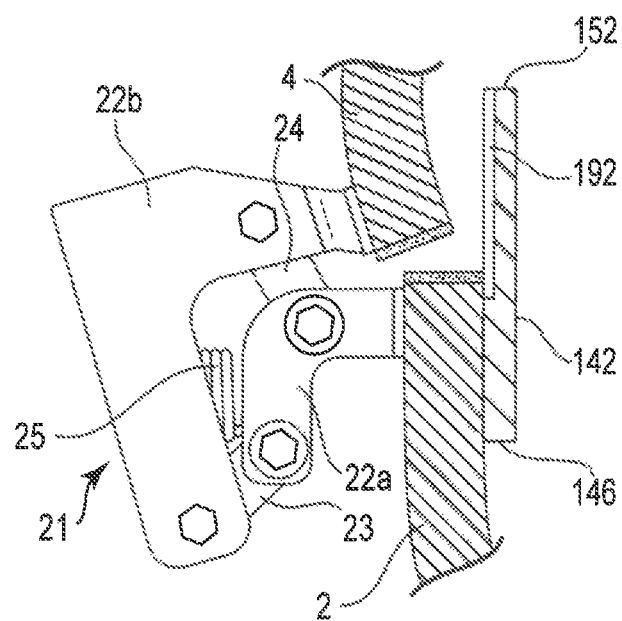
Figure 20:
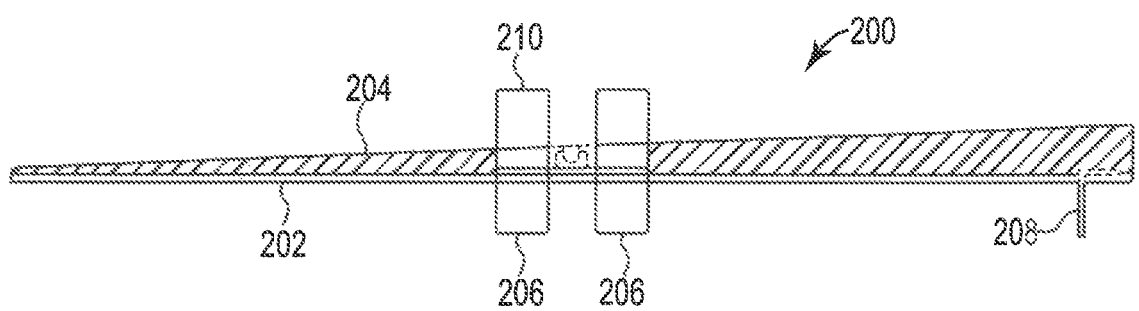
FIG. 20 is a side view of an additional embodiment of the disclosed rotisserie device support ring.

FIG. 19 is a cross-sectional view through ring 140 at the 12 o'clock ring position, and includes the hinge 21 components identified in FIG. 4. Chock 144 preferably is not present at this ring position. Inflow or outflow of air preferably is discouraged or prevented by a close fit and if need be light contact between base flange 146 and base 2, and between cover flange 152 and cover 4. As shown in FIG. 19, an optional short strip of high temperature gasket material 192 has been affixed to the outside of flanged ring 142 spanning the region proximate hinge 21 and between the terminal ends of chock 144. Doing so may improve the ring-to-base or ring-to-cover seal in portions of ring 140 proximate the hinge where chock 144 is not present.

The seal between base 2 and cover 4 proximate hinge 21 may be further improved by employing other configurations for flanged ring 142 or gasket 192. As one example (not shown in FIG. 19), a gasket seating groove may be added to flanged ring 142 in the region proximate hinge 21, and gasket 192 may be modified so that it seats in the groove and has a thicker and if need be reshaped cross-section that will fill a greater portion of the space between flanged ring 142 and the inner sidewalls of base 2 or cover 4. Flanged ring 142 may also be locally thickened as need be to increase its strength near the gasket seating groove. A relatively compressible auxiliary gasket may also or instead be supplied for insertion between base 2 and cover 4 at the portions proximate hinge 21 between the terminated ends of chock 144.

Base flange 146 desirably fits relatively snugly in a grill base such as base 2, while desirably providing sufficient radial clearance between base flange 146 and the inner wall of the grill base so as to allow for lot-to-lot variations in grill base or support ring diameter, lot-to-lot variations in grill base or support ring roundness, or for differences between the base and support ring coefficients of thermal expansion. If desired, a facing layer of high temperature-resistant gasketing material may be wrapped around base flange 146 so as to improve the ring-to-base seal or to permit greater such lot-to-lot variations. Cover flange 152 likewise desirably fits relatively snugly against a partially opened grill cover such as cover 4. As is the case with base flange 146, cover flange 152 desirably provides sufficient radial clearance between cover flange 152 and the inner wall of the grill cover so as to allow for lot-to-lot variations in grill cover or support ring diameter, lot-to-lot variations in grill cover or support ring roundness, or for differences between the cover and support ring coefficients of thermal expansion. If desired, a facing layer of high temperature-resistant gasketing material may be wrapped around cover flange 152 (in addition to or in place of the optional seal 192 shown in FIG. 19) so as to improve the ring-to-cover seal or to permit greater such lot-to-lot variations. Base flange 146 and cover flange 152 may help locate and retain ring 140 with respect to a grill base and cover.

Flanged ring 142 strengthens support ring 140 overall as well as improving the structural integrity of ring 140 if subjected to sudden temperature changes, accidental droppage or other stresses or impacts. This is especially helpful near rotisserie spit slots 156, 168 where the adjacent portions of ring 140 are thin or might be prone to notch failures. Flanged ring 142 also enables fabrication of supporting rings having a much smaller "wedge" height at the 6 o'clock ring position. This enables the overall wedge height and required degree of cover opening to be limited primarily by the clearance required to accommodate a rotisserie spit. For example, to accommodate a ⅜ inch (10 mm) diameter spit, the wedge height at the 6 o'clock ring position may be as little as ¾ inch (19 mm).

Flanged ring 142 also shields the mating grill base sealing surface and all or nearly all the mating grill cover sealing surface from grilling heat. Flanged ring 142 may accordingly compensate for a poor-fitting, loose-fitting, molten or otherwise damaged or defective grill base or cover sealing gasket.

In especially preferred embodiments of ring 140 for use with a hinged, covered ceramic grill, the entire ring 140 is any one or more of: a unitary object made entirely from one material; a molded or cast article; an article made from ceramic; an article made from the same ceramic material as that of the grill; an article having the same or essentially the same coefficient of thermal expansion as that of the grill ceramic material, or an article having the same appearance (e.g., inner or outer coloration or surface texture) or the same apparent density or strength as that of the grill ceramic material. For use with a large Big Green Egg, flanged ring 142 preferably has an overall height of about 1-4 inches (about 25-102 mm), a thickness of about ¼-¾ inches (about 6-19 mm), and extends about 0.75-3 inches (about 19-76 mm) below and about ¼-1 inches (about 625 mm) above the joinder seam. Chock 144 preferably holds the grill cover and grill base about 0.75-1.5 inches (about 19-38 mm) apart at the 6 o'clock position. When closing a moving pivot hinged grill cover like that shown in FIG. 2 onto ring 140, the cover moves outwardly (away from the hinge and toward the handle) as it moves downwardly toward the grill base. If need be, cover flange 152 may be tapered, tilted inwardly, scalloped or otherwise reduced in height proximate the hinge so as to lessen the likelihood that the grill cover will interfere with ring 140. However, tests made using a Large Big Green Egg have shown that a cover flange 150 height of about ½ inch (13 mm) does not appear to cause interference.

Ring 140 may be made of materials other than ceramic, or may be modified by adding additional features, in the same fashion as discussed above in connection with FIG. 3A through FIG. 13. For example, ring 140 may be made wholly or partly from metals, heat-resistant rubber or other materials, and may be modified to include handles, logos, warning legends, outer or inner coloration or dimpling or other surface modification, FIG. 20 shows a support ring 200 having a flat metal band 202 made for example of stainless steel or other metal, bonded to a tapered high temperature-resistant upper sealing gasket 204 made for example of silicone rubber. Ring 200 desirably includes two or more (for example, four, two of which are shown in FIG. 20) downwardly-projecting tabs 206 affixed to band 202 near the 3 and 9 o'clock positions, and one or more downwardly-projecting tabs 208 affixed to band 202 near the 6 o'clock position. Tabs 206 and 208 help discourage ring 200 from being laterally displaced away from the grill hinge or otherwise dislocated when the grill cover is closed. Tabs 206 desirably are integral parts of motor mount/rotisserie spit supports 210 (one of which is shown in FIG. 20) affixed to band 202 near the 3 and 9 o'clock positions. Ring 200 has a simple and relatively robust configuration that helps minimize material costs while providing good sealing properties and good resistance to impacts and other shock loads.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A rotisserie device, the device comprising a support ring coupleable to a partially opened hinged covered grill having a base and cover joined by the hinge, wherein the base and cover have sealing surfaces that contact one another when the grill cover is closed, and the ring:
   a. is shaped and configured to inhibit airflow into and out of the grill when the cover is partially opened,
   b. includes a tapered height cover supporting portion having grill-contacting and cover-contacting portions that hold the cover and base apart when the cover is partially opened and sealingly engage the base and cover sealing surfaces, and
   c. has an aperture in the ring that can receive a rotatable spindle having a removable, rotatable rotisserie spit.

2. A rotisserie device according to claim 1 wherein the supporting portion has a tapered height with a generally wedge-shaped side profile having a minimum height at a ring portion proximate the hinge and a maximum height at the ring portion distal to the hinge.

3. A rotisserie device according to claim 2 wherein the support ring comprises a generally cylindrical flanged ring disposed interiorly with respect to the tapered height cover supporting portion, the flanged ring having a ring height greater than that of the tapered height cover supporting portion at a plurality of corresponding positions around the flanged ring, and the flanged ring strengthening the support ring and at least partially shielding from grilling heat at least one of the base and cover sealing surfaces.

4. A rotisserie device according to claim 3 wherein the support ring comprises cast aluminum.

5. A rotisserie device according to claim 3 wherein the flanged ring has an overall height of about 1-4 inches (about 25-102 mm) and the grill-contacting and cover-contacting portions have mating surface widths of about 10 mm (0.4 inches) to about 5 cm (2 inches).

6. A rotisserie device according to claim 1 further comprising an electric reduction gear drive motor affixed to or rotatably fixed with respect to the support ring, a removable spit rotatably driven by the motor, and two or more tined forks that secure food on the spit during cooking.

7. A hinged, covered grill having a base and cover joined by the hinge and further comprising a rotisserie device according to claim 6 supporting the cover in a partially opened position.

8. A hinged, covered grill according to claim 7 wherein the grill is a generally egg-shaped kamado grill having a ceramic base and ceramic cover.

9. A hinged, covered grill according to claim 7 wherein the grill has a metal insulated base and metal insulated cover.

10. A rotisserie device according to claim 3 wherein if using clock numerals to describe regions around the perimeter of the support ring when viewed from above, with clock position 12 referring to the support ring position nearest the hinge in the hinged covered grill and clock position 6 referring to the support ring position opposite the hinge, then at 8 o'clock, 9 o'clock, 10 o'clock and 12 o'clock positions around the support ring the flanged ring height is greater than the tapered height cover supporting portion height.

11. A rotisserie device according to claim 10, wherein the flanged ring and the tapered height cover supporting portion each have upper surfaces, and at a 6 o'clock position such upper surfaces are at the same height with respect to one another as measured from the base sealing surface.

12. A rotisserie device according to claim 3 wherein the flanged ring at least partially shields the base sealing surface from grilling heat, and discourages inflow or outflow of air proximate the hinge.

13. A rotisserie device according to claim 3 wherein the flanged ring has a flanged ring thickness, and a ring height 4 to 20 times the flanged ring thickness.

14. A rotisserie device according to claim 3 wherein the flanged ring helps locate and retain the support ring with respect to the grill base and cover.

15. A rotisserie device according to claim 3 wherein the flanged ring improves the structural integrity of the support ring if the support ring is subjected to sudden temperature change or is accidentally dropped.

16. A rotisserie device according to claim 3 wherein the flanged ring and support ring are a unitary object made of cast aluminum.

17. A rotisserie device according to claim 2 wherein the wedge-shaped side profile enables a cook to close and seal the grill cover in a partially opened position when grilling using the device.

18. A rotisserie device according to claim 1 wherein the grill-contacting and cover-contacting portions sealingly engage the base and cover sealing surfaces.

19. A rotisserie device according to claim 1 wherein the base and cover sealing surfaces comprise a heat-resistant felt, fiber or flexible rope gasket.

20. A rotisserie device according to claim 1 wherein the cover supporting portion reduces heat transfer to an outer surrounding portion of the support ring.

21. A rotisserie device according to claim 1 wherein the base and cover have sealing surfaces that contact one another when the grill cover is closed and that contact the support ring when the ring is installed in a grill whose cover is partially opened at an angle between about 4 and about 10 degrees.

22. A rotisserie device, the device comprising:
   a. a support ring for use in a partially opened hinged covered generally egg-shaped grill having a ceramic base and ceramic cover, or having a metal insulated base and metal insulated cover, the base and cover being joined by the hinge and having sealing surfaces that contact one another when the grill cover is closed and that contact the support ring when the support ring is installed in a grill whose hinged cover is partially opened, the support ring:
      i. having a circular shape, and
      ii. including a tapered height cover supporting portion having grill-contacting and cover-contacting portions that hold the cover and base apart when the cover is partially opened and sealingly engage with the base and cover sealing surfaces, and
   b. an electric reduction gear drive motor that can be affixed to the support ring, a removable spit that can be received in an aperture in the support ring and rotatably driven by the motor, and two or more tined forks that can secure food on the spit during cooking.

23. A rotisserie device according to claim 22, wherein the support ring includes a generally cylindrical flanged ring disposed interiorly with respect to the tapered height cover supporting portion and strengthening the support ring, and the flanged ring and support ring are a unitary object made of cast aluminum.

24. A method for preparing to carry out rotisserie grilling in a hinged covered generally egg-shaped grill having a ceramic base and ceramic cover, or having a metal insulated base and metal insulated cover, the base and cover being joined by the hinge and having sealing surfaces that contact one another when the grill cover is closed, the method comprising:
   a. at least partially opening the grill cover;
   b. placing on the grill base sealing surface a rotisserie device comprising:
      i. a support ring having a circular shape and a tapered height cover supporting portion having grill-contacting and cover-contacting portions that hold the cover and base apart when the cover is partially opened and sealingly engage with the base and cover sealing surfaces;
      ii. an electric reduction gear drive motor affixed to the support ring; and
      iii. a removable spit having two or more tined forks that can secure food on the spit during cooking, the spit being received in an aperture in the support ring and rotatably driven by the motor; and
   c. closing the grill cover to a partially opened position in which the support ring grill-contacting and cover-contacting portions sealingly engage the base and cover sealing surfaces, and airflow into and out of the grill is inhibited.

25. A method according to claim 24, wherein the support ring includes a generally cylindrical flanged ring disposed interiorly with respect to the tapered height cover supporting portion and strengthening the support ring, and the flanged ring and support ring are a unitary object made of cast aluminum.

26. A hinged, covered grill having a base and cover joined by the hinge and further comprising a rotisserie device according to claim 22 supporting the cover in a partially opened position, wherein the grill is a generally egg-shaped kamado grill having a ceramic base and ceramic cover.

27. A hinged, covered grill having a base and cover joined by the hinge and further comprising a rotisserie device according to claim 22 supporting the cover in a partially opened position, wherein the grill has a metal insulated base and metal insulated cover.

* * * * *